United States Patent [19]

Cassonnet et al.

[11] 3,997,895
[45] Dec. 14, 1976

[54] DATA PROCESSING SYSTEM WITH A MICROPROGRAMMED DISPATCHER FOR WORKING EITHER IN NATIVE OR NON-NATIVE MODE

[75] Inventors: Jean-Claude Cassonnet, Conflans-Ste-Honorine; Andre Milleret, Santeny, both of France

[73] Assignee: Compagnie Honeywell Bull (Societe Anonyme), Paris, France

[22] Filed: Dec. 2, 1974

[21] Appl. No.: 528,824

[30] Foreign Application Priority Data

Nov. 30, 1973 France .................. 73.42708

[52] U.S. Cl. .......................................... 340/172.5
[51] Int. Cl.[2] .................... G06F 15/16; G06F 9/06
[58] Field of Search .................. 340/172.5; 444/1; 445/1

[56] References Cited
UNITED STATES PATENTS

| | | | |
|---|---|---|---|
| 3,374,466 | 3/1968 | Hanf et al. | 340/172.5 |
| 3,543,245 | 11/1970 | Nutter | 340/172.5 |
| 3,698,007 | 10/1972 | Malcolm | 340/172.5 X |
| 3,721,961 | 3/1973 | Edstrom | 340/172.5 |
| 3,766,532 | 10/1973 | Liebel | 340/172.5 |
| 3,786,430 | 1/1974 | Hajdu et al. | 340/172.5 |

Primary Examiner—Mark E. Nusbaum
Attorney, Agent, or Firm—Nicholas Prasinos; Ronald T. Reiling; John S. Solakian

[57] ABSTRACT

A data processing system having a common data bus to which access is gained by at least a control store, an arithmetic logic unit (ALU) and an emulator unit (EMU). The control store includes a microprogrammable switch for enabling either the EMU or the ALU to process instructions received on a common bus. Common opcode bits in the instruction are interpreted by either the ALU or the EMU and responded to thereby depending upon the state of a control register in the control store. The instructions are stored in a control store array in the control store coupled with the bus, and allows operation of either the ALU (native mode of operation) or the EMU (non-native mode of operation), dependent upon the microprogram's instruction in the control store thereby giving increased efficiency of operation of the system.

10 Claims, 6 Drawing Figures

DATA PROCESSING SYSTEM WITH A MICROPROGRAMMED DISPATCHER FOR WORKING EITHER IN NATIVE OR NON-NATIVE MODE

RELATED APPLICATIONS

The present application claims priority on French application Ser. No. 73,42708, filed in the French Patent Office on Nov. 30, 1973.

The following application is incorporated by reference to the instant application.

"Process Control Block", invented by J. Bienvenu et al., filed Dec. 2, 1974, having Ser. No. 528,954, and assigned to the same assignee named herein.

BACKGROUND OF THE INVENTION

The present invention relates to data processing systems and more particularly to apparatus for efficiently processing instructions of different formats in the same data processing system.

In data processing systems having the capability of emulating another data processing system, problems regarding the different architectures of the two systems are usually encountered. For example, one system, for example the emulated system, may be a byte or character operation oriented system, whereas the system emulating might be a multi-byte or word operation oriented system. Further, for variable byte operands, the length thereof may in the emulated system be specified by a flag bit in the last byte of the operand and in the emulating system by a count which is decremented as each byte of the operand is processed. Usually there are several solutions to the problem, for example, one of them being the use of software and/or firmware only, without any additional hardware in the system to perform the specified function. This solution though useful would impair the performance of the system because of the excess execution time as for example in masking operations which may be required. Another solution is to implement the emulation in terms of hardware as well as firmware.

The implementation of hardware and firmware in the emulation system envisioned, is the adding of a unit of hardware, for example, to the central data processing system which unit is called an emulation unit and which performs the functionality of the emulated system within the performance specifications of the system doing the emulation. This requirement of providing such emulation is increased where for example, as in the present invention, the data processing system includes a different architecture from that of the system to be emulated.

Thus, without disturbing the functionality of the system doing the emulation, the instruction code must be adapted and efficient switching means must be provided so that in the process of switching the execution process between the emulation unit and the arithmetic logic unit of the system, the operating speed of the total system is not severely impaired.

It is accordingly an object of the invention to provide an improved switching mechanism for switching in a data processing system between its native mode and its non-native mode of operation.

It is a further object of the invention to provide a data processing system having efficient switching means for enabling the execution of instructions in either its arithmetic logic unit or an emulation unit coupled with the system.

SUMMARY OF THE INVENTION

The purposes and objects of the invention are satisfied by providing microprogrammable switch means in a data processing system having a common data bus coupled with a control store, an arithmetic logic unit, and an emulation unit. The system may also include a data management unit, a scratch pad memory, and an address control unit. The microprogrammable switch means is included in and coupled with the control store which decodes a microprogrammable instruction included in the control store array in the control store unit thereby indicating whether the emulation unit is to interpret the code of the instruction and to perform an operation accordingly or whether the arithmetic logic unit is to interpret the code and perform an operation defined by this code. The microprogrammable switch can be set to enable the EMU or reset to enable the ALU by means of the microprogrammable instruction of the control store.

BRIEF DESCRIPTION OF THE DRAWINGS

The advantages of the foregoing configuration of the present invention becomes more apparent upon reading the accompanying detailed description in conjunction with the figures in which:

FIG. 3 illustrates by way of example the format of several microprogrammable instructions included in each of the control store words of the control store of the present invention;

FIG. 6 illustrates the format of the control store word included in the control store of the present invention.

DETAILED DESCRIPTION OF THE PREFERRED EMBODIMENTS

Figure 1:
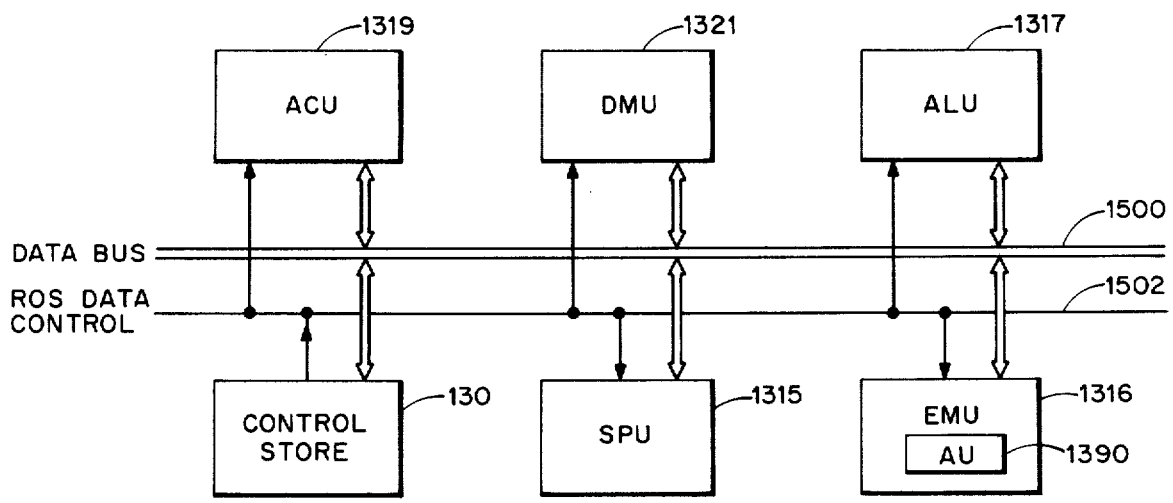
FIG. 1 is a general block diagram of the data processing system of the present invention.
Figure 2:
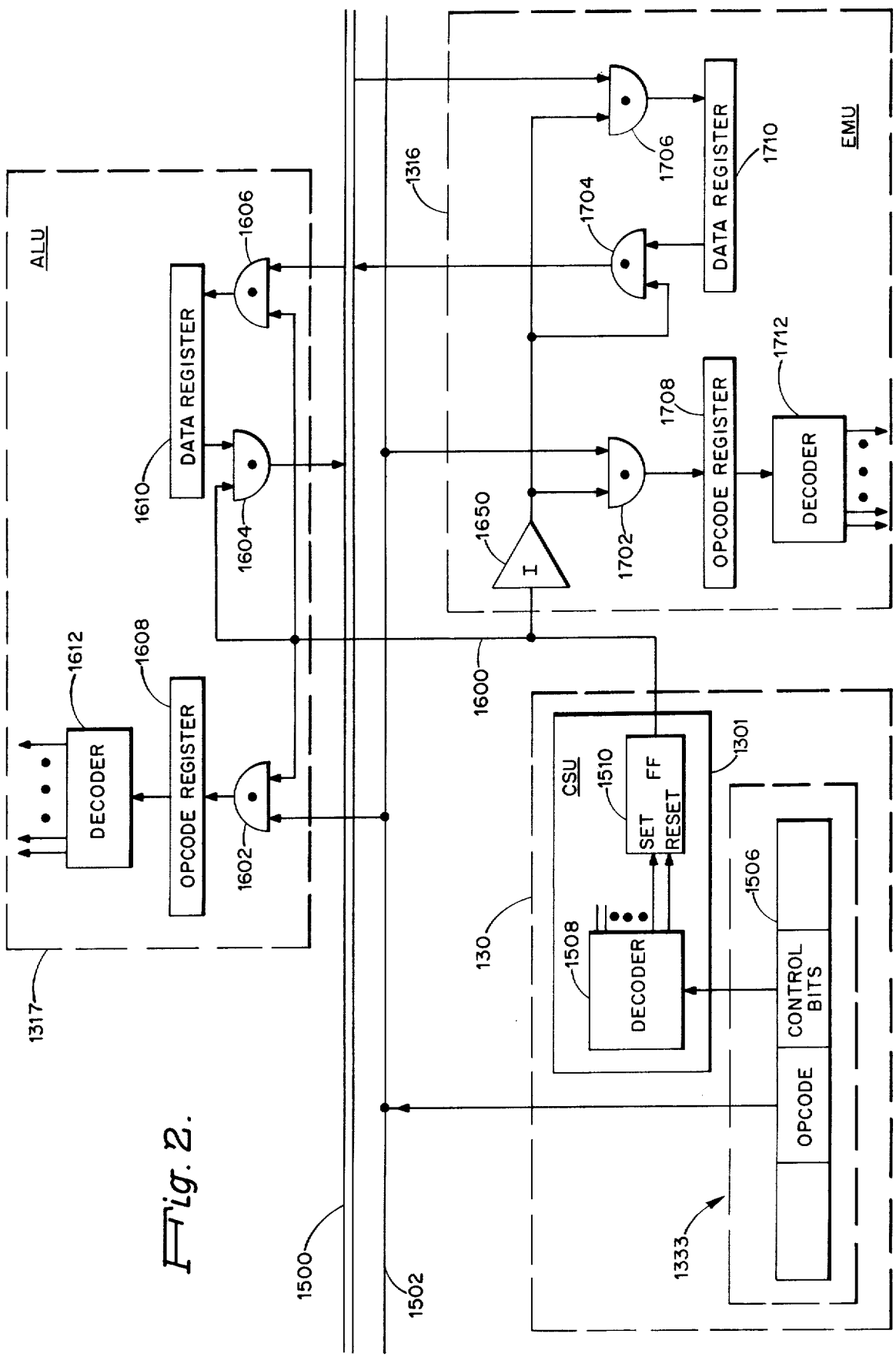
FIG. 2 is a more detailed view of the microprogrammable switch implementation of the present invention.

Now referring to FIG. 1, there is illustrated the data processing system of the present invention. The system includes a 32-bit data bus 1500 and a 32-bit read-only store (ROS) data control bus 1502, each coupled with the various units as shown in FIGS. 1 and 2. Of prime interest in the present invention is the control store 130, the arithmetic logic unit (ALU) 1317 and the emulation unit (EMU) 1316. Also included in the system and for which a detailed description may be found in the above-mentioned copending application, is the address control unit (ACU) 1319, the data management unit (DMU) 1321, and the scratch pad memory (LSU) 1315.

Generally, the address control unit 1319 communicates or interfaces with the ALU 1317, the DMU 1321, and the control store 130 via the bus 1500. The ACU 1319 is responsible for all address development in the central processing unit. All operations of the ACU including transfers to, from, and within the unit are directed by the control store microoperation logic. The DMU 1321 generally provides the interface between the central processing unit and the main memory (not shown) coupled with the data processing system of the present invention. The data management unit 1321 is responsible to recognize which unit contains the information required by the other units and to transfer the information into the central processing unit registers at the proper time. The scratch pad memory 1315 is typically comprised of 256 locations of 32 bits per location in addition to the necessary selection and read/write logic, and is used to store the central processing unit control and maintenance information. In addition, the scratch pad memory 1315 contains working locations which are primarily used for temporary storage of operands and partial results during data manipulation.

Figure 5:
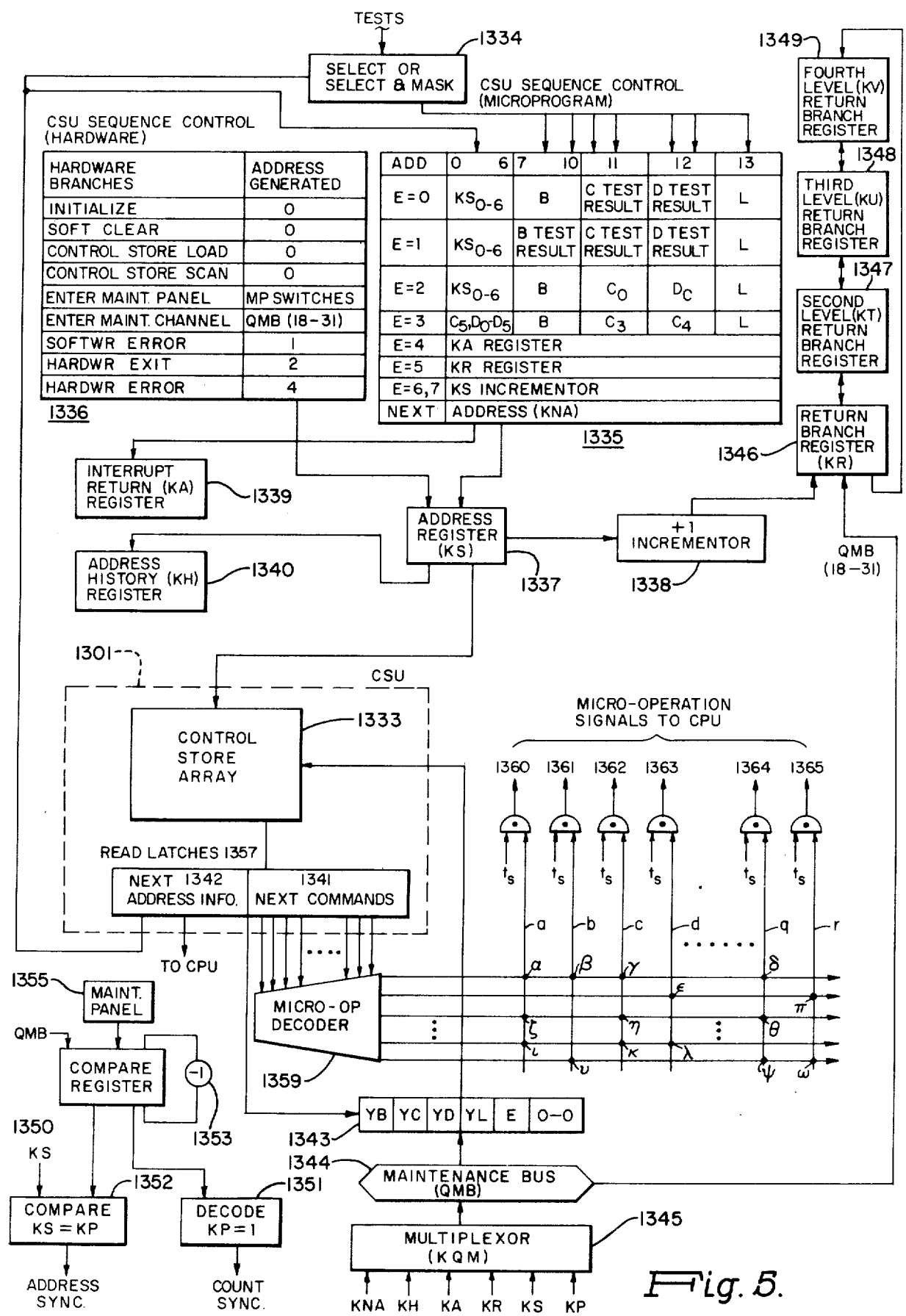
FIG. 5 illustrates details of the control store of the present invention.

The control store 130 includes a control store unit (CSU) 1301 as shown in detail in FIGS. 5 and 6 and includes a read only memory and may further include a read/write random access storage. Each location of the control store 130 stores one control store word, i.e., microinstruction, each of which controls one central processing unit operation cycle. As each location of the control store 130 is read, its contents are decoded my microoperation decoders which provide microoperation control signals, each of which cause a specific operation within the CPU to take place, as will be more fully described hereinafter.

The arithmetic logic unit 1317 generally has the primary function to perform the arithmetic operations and data manipulations required by the central processing unit. The operations of the arithmetic logic unit 1317 are dependent upon microoperation control signals received from the control store unit 1301 in control store 130. The arithmetic logic unit 1317 is of the type well known in the art. See for example the chapter on Arithmetic and Control Units in the book entitled, "Digital Computer Design Fundamentals", by Yaohan Chu, McGraw-Hill Book Company, 1962. The emulation unit 1316 may also be any one of several emulation units well known in the prior art, and includes an arithmetic unit (AU) 1390, also well known in the art, which is capable of executing arithmetic and logical operations. The emulation unit, in addition to including an arithmetic unit generally of the type indicated above, may also include further emulator capabilities as may be seen for example in those indicated in U.S. Pat. Nos. 3,544,969, 3,646,522, and 3,374,466. The ALU 1317 may be designed for example, to process 8 bit bytes of data whereas the AU 1390 included in EMU 1316 may be designed to process 6 bit bytes of data.

Each of the units is coupled with data bus 1500 and data control bus 1502 and provide certain operations depending upon the bit patterns read out of the control store array, i.e., read-only store, in the control store 130. Each functional unit has a certain number of bits of the microoperation command field of the control store word assigned to it and depending on this configuration, different control functions are generated. The basic data processing system of the present invention has been designed so that its emulation requirements are optional. In the basic system, each bit of the microinstruction has been assigned to particular units and are used to control the operations of the various units. Accordingly, some of those bits in the instructions must be shared in order to operate the emulation unit. Typically, the emulation unit 1316 would basically be providing all of its arithmetic and logic related functions within its own arithmetic unit 1390 and accordingly, the present invention envisions the sharing of the bits assigned to the ALU 1317 with the EMU 1316, in order to control the operation of one of them. Accordingly, the EMU 1316 interfaces with and may concurrently utilize the facilities of the ACU, DMU, RCU, and SPU. However, if the EMU 1316 is operative, then the ALU 1317 is not and viceversa. In order to implement the switching back and forth between the ALU and the EMU, thereby taking advantage of the properties of each of them dependent upon the instructions generated, a microprogrammable switch is utilized and is basically included in control store 130 as shown in FIG. 2.

Now referring to FIG. 2, there is shown further details of the apparatus of the present invention. More specifically, there is shown in FIG. 2 the data bus 1500 and the control bus 1502 coupled with ALU 1317, EMU 1316 and control store 130. Control store 130 includes a control store array 1333 which is initialized to store a plurality of control store words of which the microoperations subcommand field is generally shown as block 1506. The detailed structure of the control store word shall be discussed with respect to FIG. 6, however for purposes of present discussion, the microoperations subcommand field is shown to include a plurality of subfields, one of which is the opcode subfield and the other of which includes control bits for indicating whether the opcode supfield is to control the functioning of the ALU 1317 or the EMU 1316.

The opcode subfield is coupled with bus 1502 for receipt by either ALU 1317 or EMU 1316 depending upon the state of register or flip-flop 1510 as indicated on control bit line 1600. If the flip-flop 1510 is reset, then a binary zero state will exist on line 1600 and the ALU 1317 will be responsive to the opcode in bus 1502. If the flip-flop 1510 is set, then a binary one state will exist on line 1600 and the EMU 1316 will be responsive to the opcode on bus 1502. The setting or resetting of flip-flop 150 in controlled by means of decoder 1508 in response to the control bits subfield of the microoperations subcommand field 1506. In addition to the two decoder 1508 output lines used to control the state of flip-flop 1510, decoder 1508 generates further decode signals in response to the combination of control bits in order to control operations internal to control store 130.

Thus when a control store word is addressed in control store 130, control bit line 1600 is set either to a binary zero or binary one state. If line 1600 includes a binary zero state, then gates 1602, 1604 and 1606 of ALU 1317 are enabled to respectively pass the opcodes on bus 1502 to opcode register 1608, to pass the contents of data register 1610 to data bus 1500 and/or to pass the data on bus 1500 to register 1610. The contents of register 1610 are either generated by an arithmetic operation in ALU 1317 or are provided for example as an operand from bus 1500 to the various operand registers which may be included in ALU 1317. The opcode in register 1608 is decoded by means of decoder 1612 to generate control signals so as to provide for the proper function of the unit in accordance with the opcode received thereby. In a like manner, a binary one state on line 1600, as inverted to a binary zero state by inverter 1650, is used to enable gates 1702, 1704 and 1706 to enable the above-mentioned operation for ALU 1317 with the registers 1708 and 1710 and decoder 1712 in EMU 1316.

Thus, the microprogrammable switch as shown in FIG. 2 dispersed through units 130, 1316 and 1317 is responsive to control bits in the subfield of the microoperations subcommand field of the control store word. The binary zero state of control bit line 1600 accordingly enables the ALU 1317 to respectively transfer data from or data to the bus 1500. If the control bit line is in the binary one state, then EMU 1316 is enabled to pass data to and data from the bus 1500 respectively. In a like manner the opcode is received by either ALU 1317 or EMU 1316 via bus 1502. As shall be seen with respect to FIG. 6 which illustrates the detailed format of the instructions, that is, the control store word 1325 in the control store 130, such control store words may be oriented or configured to branch or switch back and forth between the ALU and the EMU modes of operation.

As can be seen from FIG. 3, five microoperation subcommand sub-fields for five consecutive control store words a-e are shown. One of such five sub-fields indicates the opcode and another subfield indicates whether or not there is to be a change from operation in the ALU or in the EMU. The other three sub-field are utilized to provide control for the other functional units coupled in the system as shall be more particularly described hereinafter. In explanation of FIG. 3, before execution of control store word a, if register 1510 has its contents equal to binary zero, then there is no operation in the emulation unit and in this case the ALU 1317 operates in accordance with the opcode instruction which may be included for word a which by example indicates a transfer of data from bus 1500 to both the accumulator register and the operand register of ALU 1317. In the next instruction, word b, the control bits (shown simply as a binary 1) indicate that the next instruction will control an EMU operation. Thus, register 1510 is set to a binary one state upon execution of word b. On the instruction indicated as word c, the EMU receives data from bus 1500 in one of its registers BW. Similarly, the next instruction, word d, indicates that the result of the binary addition of the contents of two registers EPL and BRR in EMU 1316 are transferred to bus 1500. The operation remains with EMU 1316 because the control bits have not changed. It is noted that the asterisk in the various subfields indicates that any other operation relating to the purpose of such subfield may be included at initialization time. Thus the subfield wherein the control bits are located may be utilized to control other operations in the control store 130 when a switch in operation between the ALU 1317 and EMU 1316 need not be indicated. During the next instruction, word e, the EMU remains in operation. However the control bits subfield by way of example indicates (by the binary 0 indication) that the next instruction will be operative in the ALU 1317. Thus, upon execution of word e, register or flip-flop 1510 will have been reset to indicate a binary zero on line 1600. Accordingly, the opcode of the next word is used to control the ALU 1317. In this manner, instructions or data which are best processed in the ALU 1317 or the EMU 1316 are so processed dependent on the operation or state of what may be termed a microgrammable switch, thereby improving system performance by decreasing the time required to execute a given command or control store word.

Figure 4:
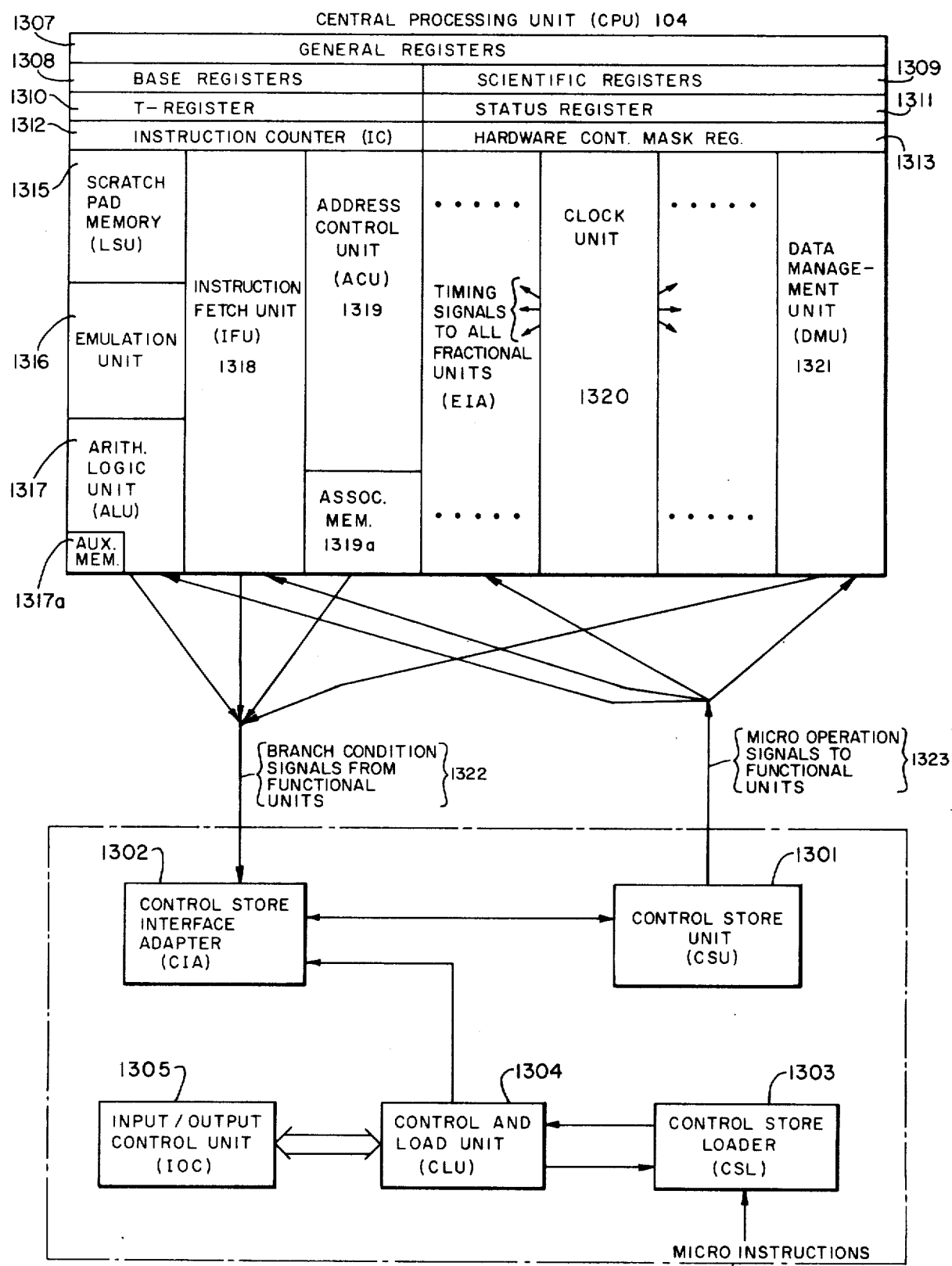
FIG. 4 is a more detailed illustration of the central processing unit and the control store of the present invention.

Referring to FIGS. 4, 5 and 6, details of the control unit are shown. The control unit, although shown separate from the central processing unit (CPU), is in actuality a part of the CPU and is comprised of a control store unit CSU 1301, a control store interface adapter CIA 1302 and appurtenant subunits, control store loader CSL 1303 and control and load unit CLU 1304.

The control store unit CSU 1301 receives microinstructions from the control store loader CSL 1303 via the control and load unit CLU 1304 and te control store interface adapted CIA 1302. Under normal operating conditions, microprograms are loaded from an external source during system initialization and become a permanent control function of the machine. However the control store unit CSU 1301 has the ability to be reloaded and initialized in a manner that provides for a variety of central processing unit CPU 1306 operational modes. The following modes of operation of the CPU are available under control of the CSU 1301; (a) native mode; (b) emulation mode (nonnative mode); (c) concurrent native and emulation modes; (d) diagnostic mode. This capability is possible because the micro-instructions resident in the CSU are the source of micro-operations used to control the operation of all other CPU functional units such as the emulation unit 1316, the arithmetic logic unit ALU 1317, the instruction fetch unit IFU 1318, the address control unit ACU 1319 and the data management unit DMU 1321. Also shown within the central processing unit CPU 1306 are general registers 1307, base registers 1308, scientific registers 1309, T-registers 1310, status registers 1311, instruction counter IC 1312, and hardware control mask register 1313 a further description of which may be found in the above-mentioned copending patent application.

Typically the control store unit CSU 1301 is a 9K bipolar integrated circuit programmable read-only memory (PROM) mixed with read/write random access store (RAM). It has a typical 150 nanosecond read cycle and a 450 nanosecond write cycle. Each location of control store stores one 84-bit micro-instruction word, and each micro-instruction word controls one CPU cycle. As each location of the control store of the control store unit CSU 1301 is read, its contents are decoded by micro-operation decoders which provide microoperation control signals each of which causes a specific operation within the CPU to take place.

By grouping locations within each micro-instruction word (to be later described in detail), control store sequences are obtained that can perform a specific CPU operation or instruction. As each instruction is initiated by the CPU, certain bits within the op-code are used to determine the control store starting sequence. Testing of certain flops (not shown) which are set or reset by instruction decode functions allows the control store memory to branch to a more specific sequence when necessary.

The control store interface adapter CIA 1302 communicates with the control store unit 1301, the data management unit DMU 1321, the address control unit ACU 1319, and the arithmetic logic unit ALU 1317 for directing the operation of the control store memory 1333 of FIG. 5. The CIA 1302 includes logic for control store address modification, testing, error checking, and hardward address generation. Hardware address generation is utilized generally for developing the starting address of error sequences or for the initialization sequence.

The data management unit DMU 1321 provides the interface between the CPU 104 and the main memory and/or buffer store memory not shown. It is the responsibility of the data management unit to recognize which unit contains the information required by other units and strobe the information into the CPU registers at the proper time. The data management unit DMU also performs the masking during partial write operations.

The instruction fetch unit IFU 1318 interfaces with the DMU 1321, the ACU 1319, the ALU 1317, and the CSU 1301, and is responsible for keeping the CPU supplied with instructions. The instruction fetch unit has the next instruction available in its registers before the completion of the present instruction. To provide this capability, the instruction fetch unit IFU 1318 contains a 12-byte instruction register (not shown) that normally contains more than one instruction. In addition, the IFU, under control of the CSU, requests information (instructions) from main memory before the instruction is actually needed, thus keeping its 12-byte instruction register constantly updated. Instructions are thus prefetched by means of normally unused memory cycles. The instruction fetch unit also decodes each instruction and informs the other units of the instruction's length and format.

The address control unit ACU 1319 communicates with the IFU, ALU, DMU, and the CSU via the CIA. The ACU 1319 is responsible for all address development in the CPU. All operations of the ACU, including transfers to, from, and within the unit, are directed by CSU micro-operation and logic in the unit. The normal cycling of the ACU depends on the types of addresses in the instruction rather than on the type of the instruction. Depending on the address types the ACU may perform different operations for each address in an instruction. The ACU also contains an associative memory 1319a that typically stores the base address of the 8 most recently used memory segments, along with their segment numbers. Each time a memory request is made, the segment number is checked against the associative memory contents to determine if the base address of the segment has already been developed and stored. If the base address is contained in the associative memory 1319a, this address is used in the absolute address development, and a considerable amount of time is saved. If the base address is not contained in the associative memory 1319a it is developed by accessing the main memory tables. However, after the base address of the segment is developed, it is stored in the associative memory, along with the segment number, for future reference.

Interfacing with the ACU, IFU, DMU, and the CSU is the arithmetic and logic unit ALU 1317. Its primary function is to perform the arithmetic operations and data manipulations required of the CPU. The operations of the arithmetic logic unit are completely dependent on micro-operation control signals from the control store unit CSU 1301.

Associated with the ALU 1317 and the CSU 1301 is the scratch pad memory unit LSU 1315, (sometimes referred to also as the local store unit). It is typically comprised of 256-location (32 bits per location) solid state memory and selection and read/write logic for that memory. The scratch pad memory 1315 is used to store CPU control information and maintainability information. In addition, the scratch pad memory 1315 contains working locations which are primarily used for temporary storage of operands and partial results during data manipulation. Also associated with the ALU 1317 is an auxiliary memory 1317a comprised typically of 64 flip-flops for storing miscellaneous states of the computer system.

The CPU also has a clocking unit 1320 and is essentially two clocking systems in one: the first clocking system generates the timing for the control interface adapter CIA 1302 and the second clocking system generates the timing pulses for the operations of the functional unit within the central processing unit.

Referring now to FIG. 6, there is shown the format of the control store word 1325. The control store word is typically 84 bits wide and is divided into 6main fields:
 a. sequence type field 1326 (3 bits);
 b. branching and/or micro-operations 1327 (23 bits);
 c. constant generation and designation 1328 (14 bits);
 d. data to bus 1329 (8 bits);
 e. micro-operations 1330 (32 bits); and
 f. checking 1331 (4 bits).

The 3-bit E field of the control store word 1325 is used as a sequence control field. There are typically 7 different sequence types and 1 reserved type for the instant computer system. Referring to block 1335 of FIG. 5, when E field equals binary 0, 1, or 2, branching field A, B, C, D, and L of micro-instruction 1325 is utilized to generate the next address. The first 6 bits of KS register 1337 is utilized together with the B field, a C test results, the D test results and the L field to provide the next address of the next micro-instruction which is then placed in address register KS 1337. When the E field is set to binary 4 (see block 1335) the next address selected is taken from interrupt return register KA 1339. The address stored in the KA register is the one generated by the next address generation logic when the hardware interrupt occurs. When the E field is set to binary 5 a branch is used to initiate a subreturn from a micro-program subroutine. When used, the contents of the return register KR 1346 are used as the next control store address. The return register 1346 is loaded by issuing a control store command which will load present control store address in KS register 1337 plus 1, from incrementor 1338, into the KR register 1346. A one-level-nesting subroutine ability is provided via the KT return branch register 1347. Every time the KR register 1346 is loaded the old contents of the KR register is transferred to the KT register 1347 every time the micro-program return is called; the contents of the KT register will transfer to the KR register. Third level nesting subroutine ability is provided by the KU register 1340; and fourth level nesting subroutine ability is provided by the KV return branch register 1349. When the E field of the control store word is set to binary 6 the next control store word addressed is equal to the present address in KS register 1337 plus 1 in incrementor 1338. When the E field is set to binary 7 the CSU 1301 enters the diagnostic mode and the next address will be the present address plus 1.

In addition to the sequencing control of branching to the next control store address described above and shown in block 1335, there is hardware generated sequence control shown in block 1336 of FIG. 5. (Note: Blocks 1335 and 1336 are in actuality hardware registers drawn so as to depict the different forms that the microinstruction words may take.) The hardware generated branches are overriding conditions (such as errors, initialize, control store scan, etc.) which suppress the E field and force a fixed address into the control store address register KS 1337. The branch is made by forcing an interrupt line high (not shown) for one clock period and storing the address which would have been generated under the control of the E field into the KA interrupt return register 1339. A hardware generated address will be placed into the control store address register. Certain hardward/firmware generated interrupts take priority when the interrupt-block flip-flop (not shown) which prevents additional interrupts in their class from being executed until the interrupting condition has been satisfied. A firmware micro-operation exists for controlling the resetting of the interrupt-block flip-flop for those sequences which are under firmware control. Those sequences under hardware control automatically generate a reset of the block-flop at the end of the sequence. The following conditions, listed by priority, exists in this category; (a) control store load; (b) control store scan; (c) hardware error; (d) software error. The remaining hardware conditions do not set the interrupt block-flop but do cause an immediate action to occur when generated. The following conditions listed by priority, exist in this category;

a. initialize;
b. soft-clear;
c. enter maintenance panel;
d. enter maintenance panel;
e. hardware exit.

An initialize signal causes the CSU 1301 to branch to address binary 0, clear hardware resettable errors and execute a control store load operation followed by a control store scan sequence under hardware control. It will also perform system initialize. A soft-clear signal causes the CSU 1301 to branch to address binary 0, clear hardware resettable errors and reset the interrupt block-flop. An enter maintenance panel signal causes the CSU to branch to the address preset in the CSU address switches on the maintenance panel (not shown).

An enter maintenance channel signal causes the CSU to branch to an address generated via the maintenance channel (not shown). The address loaded is from maintenance bus QMB 1344, which is part of the maintenance channel, and is right-justified. A hardware exit signal causes the CSU to branch to binary address 2. This sequence is used as a maintenance facility. At the end of the sequence a return is initiated by issuing an E field branch with the E field set to binary 4.

A control store load signal causes the CSU to branch to address binary 0. It also turns off the CSU read-cycle flop (not shown), the system clock 1320, and places the CSU in the load state. In the load state the CSU can be loaded from the control store loader CSL 1303, the IOC 1305, the main memory 102, or the maintenance panel 1355. When loaded from the CSL an automatic scan is generated at the end of the load. When loaded from any other media a scan may be issued by either generating a micro-operation signal or setting the scan switch on the maintenance panel. A control store scan signal causes the CSU to branch to an address binary 0. A control store scan is under hardware control for the duration of the sequence. During the scan the system clock 1320 is off and therefore no commands or tests are executed. At the end of the scan sequence the hardware transfers the contents of the interrupt return register KA to the address register KS, the system clock is turned on and control is returned to the firmware.

A hardware error signal causes the CSU to branch to address binary 4. In the normal processing mode a hardware error detected in any CPU functional unit will activate a hardware error line (not shown). The control store sequence generated will test the system conditions to determine the action to be taken. In the diagnostic mode, error conditions which are hardware detectable are visible to microdiagnostics. The microdiagnostics control the action to be taken. A software error signal on the other hand causes the control store to branch to address binary 1. This address is the start of the software error reporting sequence which is under micro-program control.

Referring once again to FIG. 5, the E field 1326 is a 3 bit field for the branch code as previously described. The branching and/or micro-operation field 1327 is comprised of the A, B, C, D, and L fields (also shown on block 1335 of FIG. 5) wherein the A field is the upper 6 bits of the next address, the B field is the middle 4 bits of next address of the mask field on 64-way branch, the C field is a 6 bit test field for 1 of 64 tests, the D field is another 6 bit test field for 1 of 64 tests, and the L field is the least significant bit. The K field 1328 is a 14 bit field of which 6 bits are for the constant field, 4 bits are for a constant or steering field, and 4 bits are a steering field for a constant. The data to bus field 1329 is comprised of the QA field having 4 bits for controlling information to the QA portion of the QMB bus 1344 and the QB field has 4 bits for controlling information to the QB portion of the QMB bus 1344. The F field 1330 is a 32 bit field which is coded to generate micro-operation subcommands. The F field is divided into five main subfields; one is coded to generate micro-operations or subcommands to the ACU 1319 and DMU 1321, another is coded to generate micro-operation subcommands to the LSU 1315, a third subfield is coded to generate microoperation subcommands to either the ALU 1317 or the EMU 1316 depending upon the state of control bits in one of the two remaining subfields which are in addition utilized to control operations within the control store 130. The P field 1331 is comprised of 4 bits reserved for checking.

In operation the micro-instruction words are stored in the control store array 1333. During a cycle of operation, the control store array is adressed by the contents of the KS address register 1337. This causes the contents of the location specified by the address to be read into the group of read latches 1357. Portions of the word contents of the read latches are distributed or transferred to storage registers within each of the functional units in the CPU. Each functional unit includes decoding logic circuits for generating the requisite subcommands specified by the control store word under control of the system clock source. In general decoding is performed within each functional unit in the CPU rather than being performed centrally in order to minimize the decoding time and to reduce the number of cables which would be normally required for transmitting command signals if decoding were performed centrally. Additionally, the decoding is done within each unit to avoid timing problems arising from differences in cable delays.

A typical decoder unit 1359 is shown in FIG. 5 as receiving various fields from micro-instruction words and generating micro-operation signals $a, b, c, d, \ldots q, r$. A typical micro-operation decoder 1359 receives commands from a micro-instruction word. The field from the micro-instruction word is decoded and sets one of a plurality of lines $s, t, u, \ldots y, z$ high. A matrix is formed by having predetermined control line impedance coupled to the $s$–$z$ lines at points $\alpha, \beta, \gamma \ldots \Psi, \omega$. Typically then when the field from a micro-instruction is decoded one of the lines $s$–$z$ goes high. Since the black dots shown in the matrix by Greek letters $\alpha$ through $\omega$ represent impedance coupling between the two sets of lines, any electrical signal propagating along any horizontal wire will be coupled through to propagate along the vertical wire a-r where an impedance coupling (black dot) is indicated. Each vertical line $a-r$ then may be coupled as one input to one each of AND gates 1360–1365. Other input signals may also be coupled to AND gates 1360–1365 including a timing signal $t_s$ from the central timing unit. According as each timing signal $t_s$ goes high those gates which have all the other input signals high will be enabled and will provide micro-instruction signals to predetermined functional units in the CPU. For example, if a command 1341 from read latch 1357 is decoded and a horizontal line is high the $a$, $b$, $c$, and $q$ vertical control lines will be high and AND gates 1360, 1361, 1362, and 1364, will be enabled as the $t_s$ timing signal is applied to these gates sequentially. Hence the combination in which the vertical control lines are coupled to the horizontal control line at different points represented by the Greek letters $\alpha$ through $\omega$ represent a permanent switching matrix for supplying micro-operation signals to the central processing unit CPU for controlling the functional units within the central processing unit by micro-instructions furnished from the control store array 1333. Thus permanent firmware having an alterability feature can be built into the machine of this invention by merely specifying the sequence of micro-operations that is required as a capability of the computer system.

Under normal conditions data is written into the control store array 1333 via the CPU write-data register also known as the local register YO 1343. A control flop (not shown) defines whether the upper half or lower half of the storage array is to be written. Data from the control and load unit CLU 1304 arrives at the CIA/CSU via the maintenance bus QMB 1344 and is buffered by the storage local register YO 1343 before being written into the control store array 1333. The storage local register 1343 is time shared as both a read and a write local register. The multiplexor KQM 1345 may be controlled by either the maintenance panel 1355 or by microdiagnostics and provides a read out path from the registers connected to it. A compare register KP 1350 is provided for non-functional use and is used mainly for maintenance purposes and is utilized along with compare logic 1352 and decode logic 1351.

Having described the invention, what is claimed as new and novel and for which it is desired to secure Letters Patent is:

1. A data processing system comprising:
    A. an arithmetic logic unit for executing instructions in a native or normal mode of operation of said system;
    B. an emulation unit for executing instructions in a nonnative mode of operation of said system;
    C. microprogram storage means comprising a plurality of instructions, each of said instructions comprising a plurality of fields, one of which fields defines the operation to be provided by either said arithmetic logic unit or said emulation unit, and another of which fields includes a code for indicating whether said operation is to be provided by said arithmetic logic unit or said emulation unit;
    D. decoder means for decoding the contents of said fields and generating control signals responsive thereto;
    E. common bus means coupled between said arithmetic logic unit, said emulation unit and said microprogram storage means for transfer of data and instructions therebetween; and
    F. microprogrammable switch means, including said decoder means, responsive to said control signals decoded from the contents of said another of said fields, said switch means comprising
        1. means for transferring the contents of said one of said fields over said common bus means to either said arithmetic logic unit or said emulation unit,
        2. means for enabling the transfer of data between either said arithmetic logic unit or said emulation unit and said common bus means,
        3. first means for generating a first signal if said code in said another of said fields indicates that said arithmetic logic unit is to provide said operation,
        4. second means for generating a second signal if said code in said another of said fields indicates that said emulation unit is to provide said operation; and
        5. register means coupled to store said first signal or said second signal generated by either said first or second means for generating.

2. A system as in claim 1 wherein said common bus means comprises:
    A. a control bus; and
    B. a data bus.

3. A system as in claim 1 wherein said register means includes a bistable storage device, said bistable storage device including means for coupling said first signal to set said bistable storage device in a first state and said bistable storage device including means for coupling said second signal to set said bistable storage device in a second state.

4. A system as in claim 3 further comprising:
    A. a control line coupled with said bistable storage device for receiving either said first state or said second state; and wherein
    B. said means for transferring includes gate means responsive to said first or second state for enabling the transfer of said contents over said control bus; and wherein
    C. said means for enabling includes gate means responsive to said first or second state for enabling the transfer of said data over said data bus.

5. A system as in claim 4 wherein said arithmetic logic unit is capable of executing instructions of a first format and wherein said emulation unit comprises an arithmetic unit capable of executing instructions of a second format.

6. A system as in claim 5 further comprising:
    A. a memory comprising a plurality of storage locations;
    B. means for managing the flow of data in said system;
    C. means for controlling the addressing of said units, said locations and said instructions in said storage means; and
    D. means for coupling said memory, said means for managing and said means for controlling with said common bus means in order to enable the transfer of data and instructions in said system.

7. A data processing system comprising a memory storage unit, address control means and data management means, said system further comprising:
    A. first arithmetic means for providing arithmetic operations on instructions of a first format;
    B. emulation means for executing in said system instructions of a second format previously designed for use on another data processing system, said emulation means including second arithmetic means for providing arithmetic operations on instructions of said second format;

C. microprogram storage means comprising a plurality of locations each for storing instructions of either said first or second format, said instruction of both said first and second formats including at least a first and a second field, said first field including a first code for defining the operation to be provided by either said first arithmetic means or said emulation means, and said second field including a second code for indicating whether the operation indicated by said first code is to be enabled in said first arithmetic means or said emulation means;

D. first decoder means for decoding the contents of said fields and generating control signals responsive thereto;

E. common bus means coupled in parallel between said storage unit, said control means, said management means, said arithmetic means, said emulation means, and said storage means, said common bus means including
  1. a data bus, and
  2. a control bus;

F. microprogrammable switch means including said first decoder means responsive to control signals decoded from the contents of said second code in said second field, said switch means comprising
  1. first gate means coupled for transferring said first code over said control bus to said first arithmetic means,
  2. second gate means coupled for transferring said first code over said control bus to said emulation means, and
  3. means for coupling said second code in said second field to enable either said first or said second gate means.

8. A system as defined in claim 7 further comprising means in said address control means for sequentially addressing said locations in said microprogram storage means, and wherein said second code is included in said second field only when the operation provided by said first arithmetic means is to be switched to the operation provided by said emulation means or when the operation provided by said emulation means is to be switched to the operation provided by said first arithmetic means, and wherein said second code is included in said second field of the instruction preceding in operation the instruction by which said switching will have occurred.

9. A system as defined in claim 8 wherein said microprogrammable switch means further comprises:
  A. second decoder means included in said first decoder means responsive to said second code including:
    1. means for generating a first signal if said second code indicates that said first arithmetic means is to provide the operation indicated by said first code, and
    2. means for generating a second signal if said second code indicates that said emulation means is to provide the operation indicated by said first code; and
  B. bistable storage means coupled to said decoder means to be set in a first state in response to the generation of said first signal or to be set in a second state in response to the generation of said second signal.

10. A system as defined in claim 9 wherein said instructions comprise third and fourth fields, said system comprising:
  A. means for coupling the contents of said third field to control the operation of said address control means;
  B. means for coupling the contents of said fourth field to control the operation of said data management means; and
  C. means for enabling the transfer of data between said first arithmetic means or said emulation unit and said data bus.

* * * * *